(12) United States Patent
Takano

(10) Patent No.: US 6,463,340 B2
(45) Date of Patent: Oct. 8, 2002

(54) CONTROL SYSTEM

(75) Inventor: Takuo Takano, Fujisawa (JP)

(73) Assignee: Denno Co., Ltd., Yokohama (JP)

( * ) Notice: Subject to any disclaimer, the term of this patent is extended or adjusted under 35 U.S.C. 154(b) by 0 days.

(21) Appl. No.: 09/874,142

(22) Filed: Jun. 6, 2001

(65) Prior Publication Data

US 2001/0056528 A1 Dec. 27, 2001

(30) Foreign Application Priority Data

Jun. 8, 2000 (JP) ........................................ 2000-172452

(51) Int. Cl.[7] .............................................. G05B 11/01
(52) U.S. Cl. ........................................... 700/20; 700/19
(58) Field of Search .............................. 700/86, 19, 20

(56) References Cited

U.S. PATENT DOCUMENTS

| 5,068,823 | A | * | 11/1991 | Robinson ..................... 716/16 |
| 5,251,206 | A | * | 10/1993 | Calvignac et al. .......... 370/392 |
| 5,442,542 | A | * | 8/1995 | Cook ........................... 700/12 |
| 5,835,405 | A | * | 11/1998 | Tsui et al. .................. 365/182 |
| 6,202,197 | B1 | * | 3/2001 | Robinson et al. ............. 716/17 |
| 6,317,804 | B1 | * | 11/2001 | Levy et al. ................. 710/129 |

FOREIGN PATENT DOCUMENTS

JP 2000-172452 6/2000

OTHER PUBLICATIONS

U.S. patent application Ser. No. 09/244846, Takano, filed Feb. 4, 1999.

* cited by examiner

Primary Examiner—Thomas Black
Assistant Examiner—Ronald D Hartman, Jr.
(74) Attorney, Agent, or Firm—Pillsbury Winthrop LLP

(57) ABSTRACT

Centralized registers in which commands can be written are provided in correspondence with a plurality of control modules. Centralized registers for managing the pre-emption status of control modules and their tree-configuration hierarchical relations are also provided in correspondence with a plurality of control modules. Control modules to which a command should be transmitted are specified by looking up the registers that manage the pre-emption status and the tree-configuration hierarchical relations. When control modules have been specified, the latched command is written to the registers in which commands can be written.

6 Claims, 12 Drawing Sheets

CONTROL SYSTEM

CROSS REFERENCE TO RELATED APPLICATIONS

The present invention claims priority from Japanese Patent Application No. 2000-172452 filed Jun. 8, 2000, the contents of which are incorporated herein by reference.

BACKGROUND OF THE INVENTION

1. Field of the Invention

The present invention relates to a technique for standardizing computer programs used for control purposes. It relates in particular to a technique for running such programs more simply by standardizing their design, modification and major alteration. The invention also relates to a control system wherein a plurality of control modules are arranged in an hierarchical structure and serve to individually control a plurality of controlled elements contained within a single controlled system. The invention further relates to a control program for this control system.

2. Description of Related Art

A previously proposed structure of a control system provides a plurality of controlled elements in a single control system and a plurality of control modules for individually controlling these controlled elements, and controls these control modules hierarchically.

Regarding this control system, the present applicant has proposed a technique wherein all the control modules have a standardized set of modes and mode transitions, and the components of the overall control system are in an hierarchical structure (see U.S. patent application Ser. No. 09/244, 846, hereinafter termed the "prior application"). In the present application, each control module is understood to be such a component.

The prior application will be described with reference to FIG. 12 and FIG. 13. FIG. 12 shows the overall configuration of a control system according to the prior application, while FIG. 13 is a block diagram of a control module according to the prior application. As shown in FIG. 12, according to the previously proposed control system there are provided a plurality of controlled elements $E(0)$ to $E(m)$ and a plurality of control modules $M(0)$ to $M(n)$ for individually controlling these controlled elements $E(0)$ to $E(m)$, and these control modules $M(0)$ to $M(n)$ are controlled hierarchically. Communication among the control modules is carried out by way of communication lines $C(0)$ to $C(n)$ and communication memory COM.

In this control system, even if a certain control module does not use one of the modes belonging to the basic module, that mode is still provided in conformity with the basic module. Moreover, the modes and mode transitions are not extended beyond those provided in the basic module. If there is a need to extend the modes and mode transitions available, another basic module is designed. All the control module modes and mode transitions are standardized in at least one closed control system. All sorts of control states can be designed by setting parameters for these modes and mode transitions in accordance with the conditions imposed by the control specification and the controlled elements.

Thus, by standardizing the modes and mode transitions that the control modules have in common, a control module can be treated in terms of the concept of a component of a control system, which can then be constructed by assembling such components. A further consequence of this approach is that the updating of a control system can be treated in terms of the concept of the replacement of components.

Thus, by standardizing the modes and mode transitions that the control modules have in common, a control module can be treated in terms of the concept of a component of a control system, which can then be constructed by assembling such components. A further consequence of this approach is that the updating of a control system can be treated in terms of the concept of the replacement of components.

In the present application, the applicant has focused on the fact that the control system of the prior application can be made even easier to use by employing a plurality of command types with different characteristics.

This can be achieved by for example providing a convenient command for dealing with circumstances that differ from normal operation, as when the control system is initialized, during maintenance and checking, or when a fault occurs. Alternatively, restrictions on controlled elements or the order in which these elements are controlled can easily be set by providing commands with different scopes. See Takano et al Application No. 09/801,790 filed Mar. 9, 2001.

Using these ideas, a desired sequence of operations can be executed by using job commands to elicit the functions of control modules, and by using state commands to cause these control modules to undergo state transitions. In addition, when a situation occurs that makes it desirable for control modules to undergo state transitions as a matter of urgency during the execution of a sequence, this can be achieved by means of an event command.

The term "pre-emption processing" will be used to denote the process wherein a command issuing source acquires in advance the right to issue a command to a control module that is the target of that command. Job commands and state commands are commands that require pre-emption processing to be carried out in advance in relation to the control module that is the target of the command, and they are commands that become valid for a pre-empted control module. As opposed to this, an event command does not require pre-emption processing to be carried out in advance, and can be issued to any desired control module.

Commands other than job commands spread to control modules hierarchically below the control module that has received the command. A state command spreads to hierarchically lower control modules that are not currently pre-empted by another command issuing source. From the outset, an event command does not require pre-emption processing, and spreads to all hierarchically lower control modules.

It may be noted that although pre-emption processing is not required in order to issue an event command, a control module that is the destination of an event command performs, either simultaneously with or subsequent to receipt of the event command, the same processing as when it is pre-empted. The control module is able to undergo appropriate state transitions in accordance with the state of hierarchically superior control modules after this processing is cancelled.

Furthermore, a control module that is connected hierarchically below a control module that is the destination of an event command should have an existing state of pre-emption cancelled when it receives the event command. The aforementioned "same processing as when it is pre-empted" that is performed by a control module that is the destination of an event command includes, for example, recording information relating to the issuing source of that event command, and deleting this recorded information when the processing is cancelled. This enables the event command issuing source to recognize the validity or invalidity of the processing.

It has been found that if commands are issued and received using the system configuration of the prior application, the time required for a command to be transmitted to the relevant control modules is sometimes not negligible from the point of view of performing control.

For example, with the system configuration of the prior application, when a state command is issued to a particular control module, the control module that receives this state command looks up hierarchically lower control modules that are not currently pre-empted by another command issuing source, and causes the state command to propagate to all these hierarchically lower control modules. Each hierarchically lower control module that receives the propagated state command also looks up hierarchically lower control modules that are not currently pre-empted by other command issuing sources, and likewise causes the command to propagate to these modules. The command is transmitted to the required control modules by repeating this process.

Although the processing time at an individual control module is extremely short, the number of control modules can amount to several hundred, several thousand or even more, and in this case the overall processing time in the system as a whole may not be negligible from the point of view of control.

During this overall command transmission and processing time interval there will be control modules that have already received the command and control modules that have not yet received it, and because the modules are not synchronized, an erroneous control procedure could be carried out. Halting the control procedure during the command transmission and processing period might be considered as a means of avoiding this sort of situation, but halting a control procedure each time a command is issued results in inefficient control. To avoid this, the transmission and processing of a command is preferably carried out all at once in a short time.

SUMMARY OF THE INVENTION

The present invention has been devised in the light of this situation, and it is an object of the invention to provide a control system capable of transmitting and processing commands in a short time. It is a further object of the invention to provide a control system capable of coping easily with a plurality of different situations, and of simplifying control, by using a plurality of command types with different characteristics.

The present invention provides, in correspondence with a plurality of control modules, centralized registers in which commands can be written. It also provides, again in correspondence with a plurality of control modules, centralized registers for managing the pre-emption status of the control modules and their tree-configuration hierarchical relations.

When a command, and information relating to the destination of that command, arrive from a command issuing source, they are latched. While they are latched, the control modules to which the command is to be transmitted are specified in accordance with information recorded in the aforementioned registers for managing the pre-emption status and the hierarchical relations. When the control modules have been specified, the latched command is written in those regions of the aforementioned registers in which commands can be written that correspond to the control modules in question. This enables the command to be transmitted in a short time.

In other words, this invention is a control system having a plurality of control modules connected in tree-configuration hierarchical relations successively branching from top to bottom, and having means for transmitting prescribed commands to these control modules.

This invention has the following features. Namely, it provides a "command write register group" having, in correspondence with the aforementioned control modules, a plurality of "command write registers" in which commands can be written; the aforementioned transmitting means has means for writing commands in the command write register group in accordance with the aforementioned tree-configuration hierarchical relations; and this writing means includes means for expressing the tree-configuration hierarchical relations by turning intersections of a switch matrix on or off prior to writing a command, and means for writing a prescribed command in the command write register group in accordance with signals instructing said writing, these signals having arrived via these intersections.

The present invention thus performs batch management of commands for all the control modules by centralizing a plurality of command write registers in one place in the form of a command write register group. It also expresses the tree-configuration hierarchical relations by turning intersections of a switch matrix on or off prior to writing a command, and inputs to the switch matrix signals instructing the writing of a command. As a result, these signals are output via the intersections of the switch matrix in accordance with the tree-configuration hierarchical relations, and a prescribed command can be written in command write registers.

Expressing the tree-configuration hierarchical relations in advance by turning intersections of the switch matrix on or off ensures that commands can be transmitted to and processed by the control modules in an extremely short time compared with the conventional method, according to which the tree-configuration hierarchical relations are found by retracing the address information during the process of writing the command.

Preferably, the invention provides pre-emption registers for recording, in correspondence with the control modules, the status of the pre-emption processing, and tree registers for recording, in correspondence with the control modules, the aforementioned tree-configuration hierarchical relations. The aforementioned means for writing commands preferably has means for identifying the type of command that has been issued; means which, when a state command has been identified, specifies, in accordance with the information recorded in the aforementioned pre-emption and tree registers, the control modules to which this state command will spread; means which, when an event command has been identified, specifies, in accordance with the information recorded in the aforementioned tree registers, the control modules to which this event command will spread; and means for writing commands to the aforementioned command write registers corresponding to these specified control modules.

The aforementioned means for writing commands is preferably provided with a switch matrix having X-axis and Y-axis signal lines, both sets of signal lines corresponding to the control modules. This switch matrix preferably has means whereby a signal instructing the writing of a command to a control module i, this signal having been output from X-axis signal line i, can be fed back as an input signal on Y-axis signal line i and then output via intersection (j, i) from X-axis signal line j as a signal instructing the writing of the command to control module j connected hierarchically below control module i.

By using a switch matrix to express the tree-configuration hierarchical relations and sending a signal instructing the writing of a command from a position corresponding to the hierarchically highest control module, a signal instructing the writing of a command can be sent to all hierarchically subordinate control modules.

In an alternative configuration, a plurality of the aforementioned switch matrices are provided, and the aforementioned means for writing commands includes means whereby a signal instructing the writing of a command to a control module i that is dealt with by another switch matrix, this signal having been output from X-axis signal line h, is used as an input signal on Y-axis signal line i of the other switch matrix; and means whereby an input signal on Y-axis signal line j, this signal having been input from another switch matrix, is output from X-axis signal line k of the local switch matrix as a signal instructing the writing of a command to a control module k that is dealt with by the local switch matrix.

When constructing, by way of example, a large-scale control system employing more control modules than a single switch matrix can deal with, a plurality of switch matrices can be utilized in this way as the equivalent of a single large-scale switch matrix. It follows that by providing in advance a plurality of switch matrices of fixed scale, any increase or decrease in the number of control modules can be dealt with right away.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
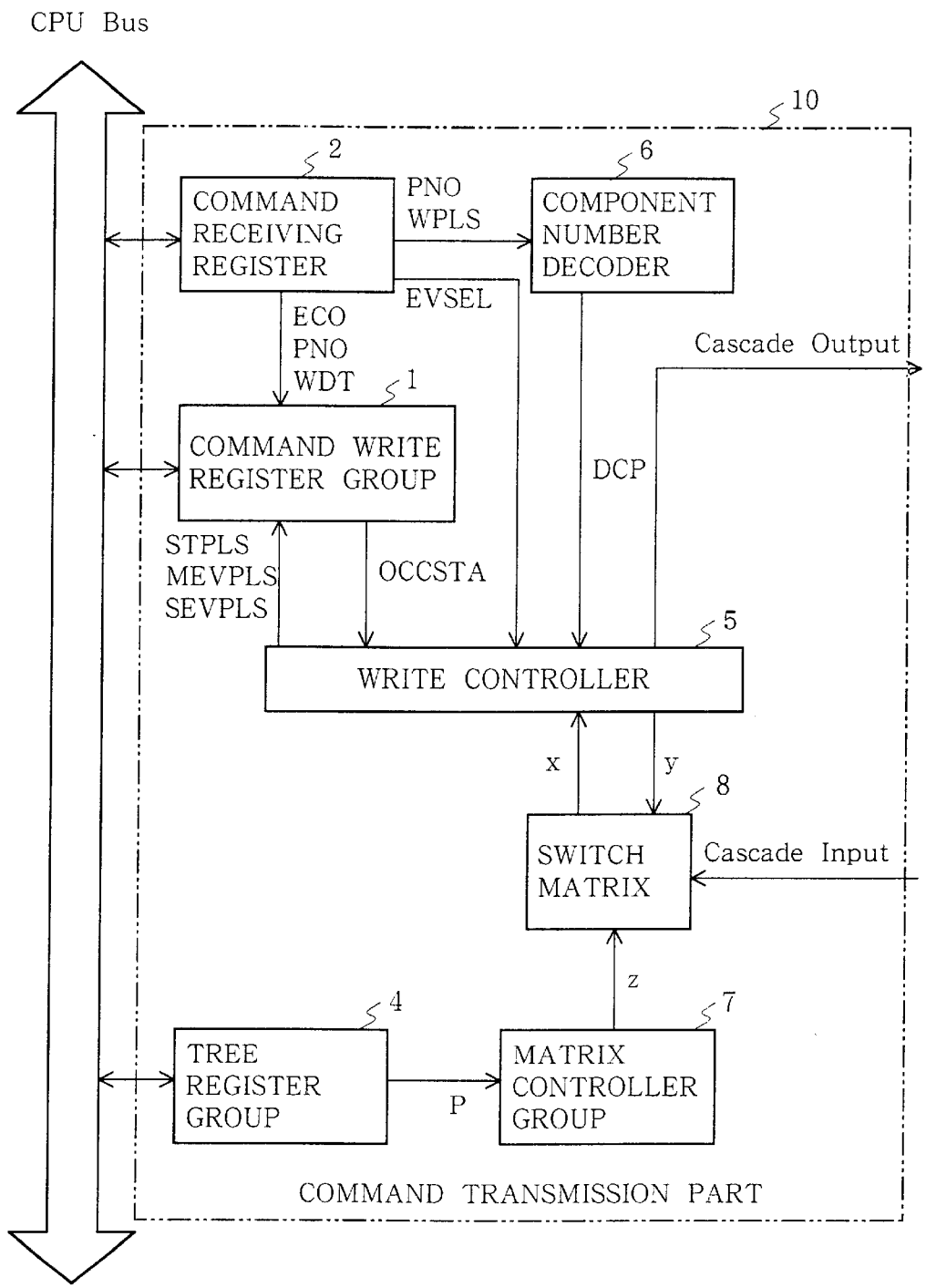
FIG. 1 is a block diagram of the command transmission part of an embodiment of the invention.
Figure 5:
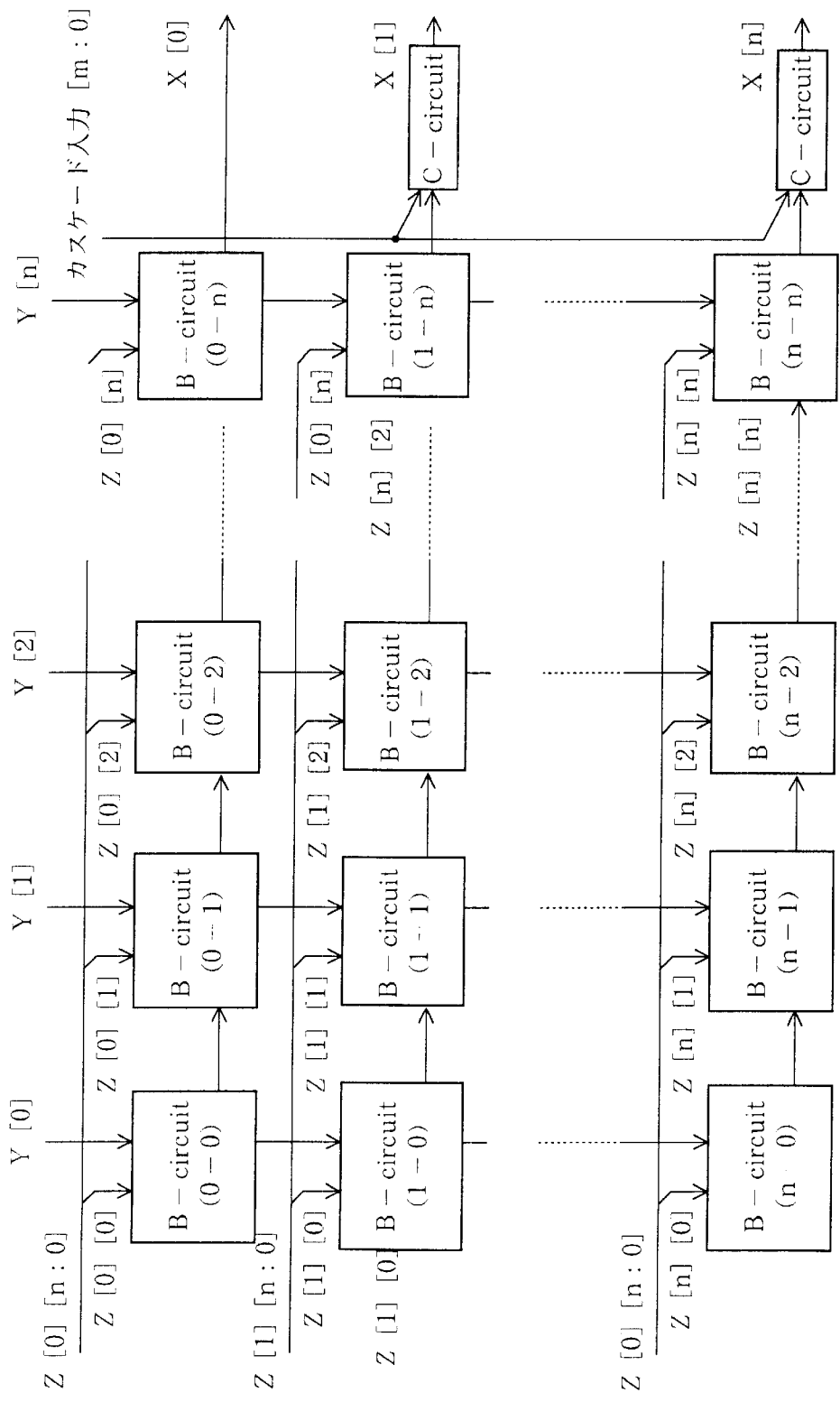
FIG. 5 is a block diagram of the switch matrix of an embodiment of the invention.
Figure 10:
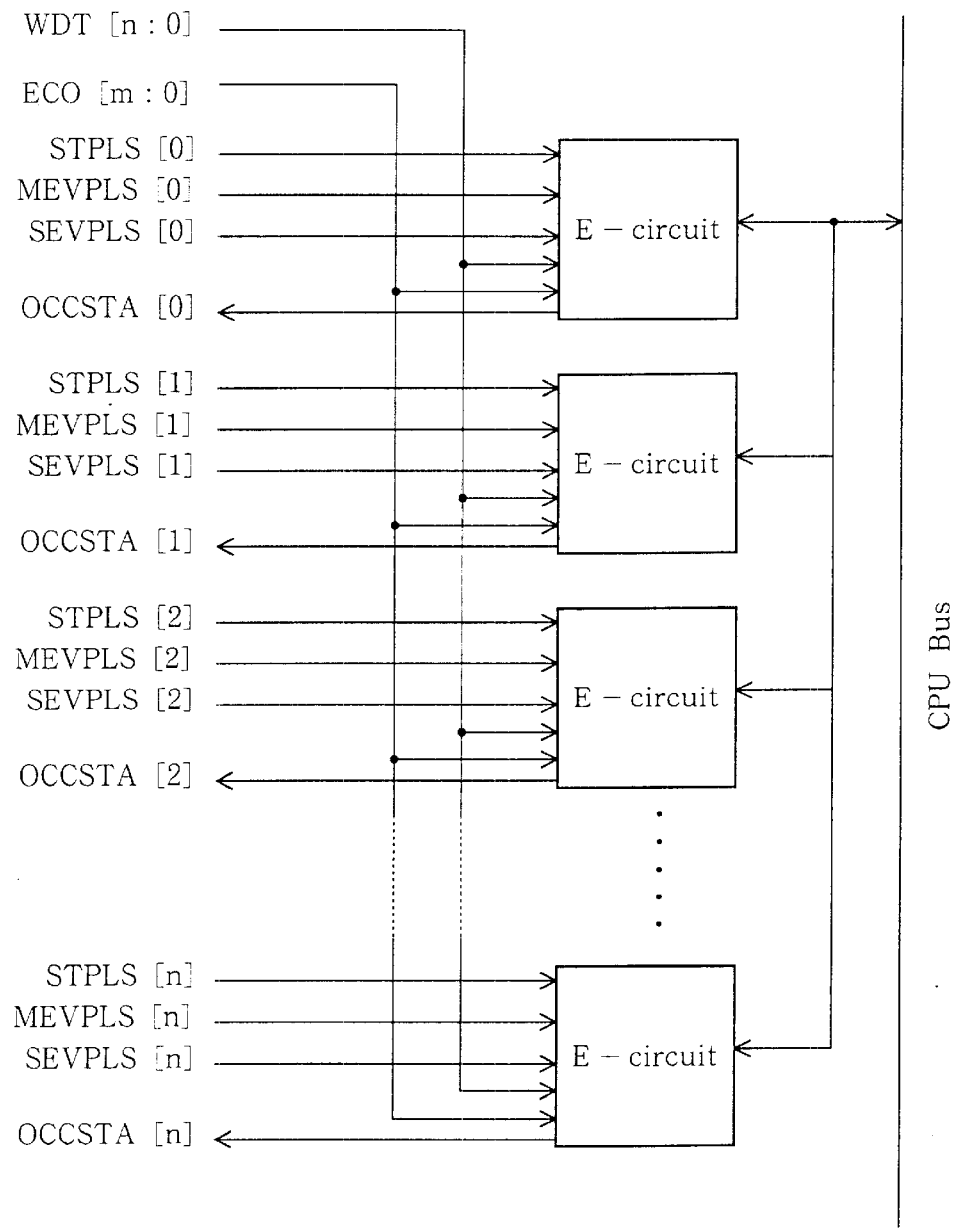
FIG. 10 is a block diagram of the command write register group of an embodiment of the invention.
Figure 11:
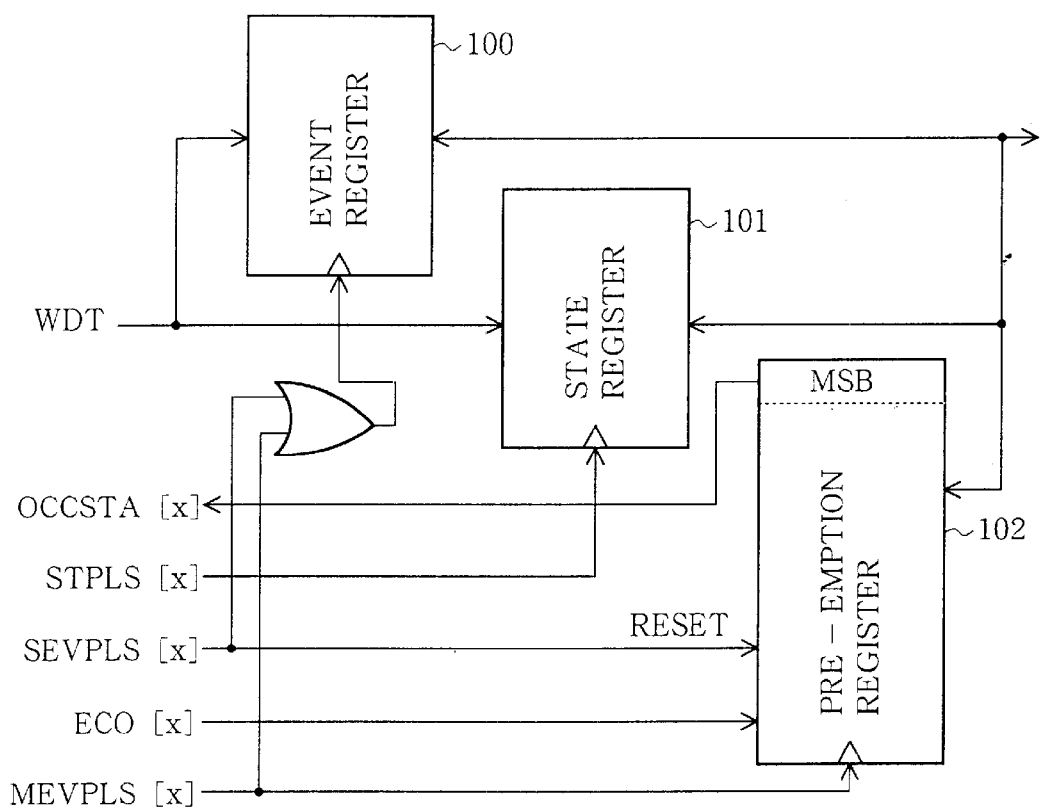
FIG. 11 shows a specific example of a command write register (an E-circuit)

The configuration of the command transmission part of an embodiment of this invention will be described with reference to FIGS. 1, 5, 10 and 11. FIG. 1 is a block diagram of the command transmission part of an embodiment of the invention. FIG. 5 is a block diagram of switch matrix 8. FIG. 10 is a block diagram of the command write register group. FIG. 11 is a block diagram of an E-circuit.

Figure 12:
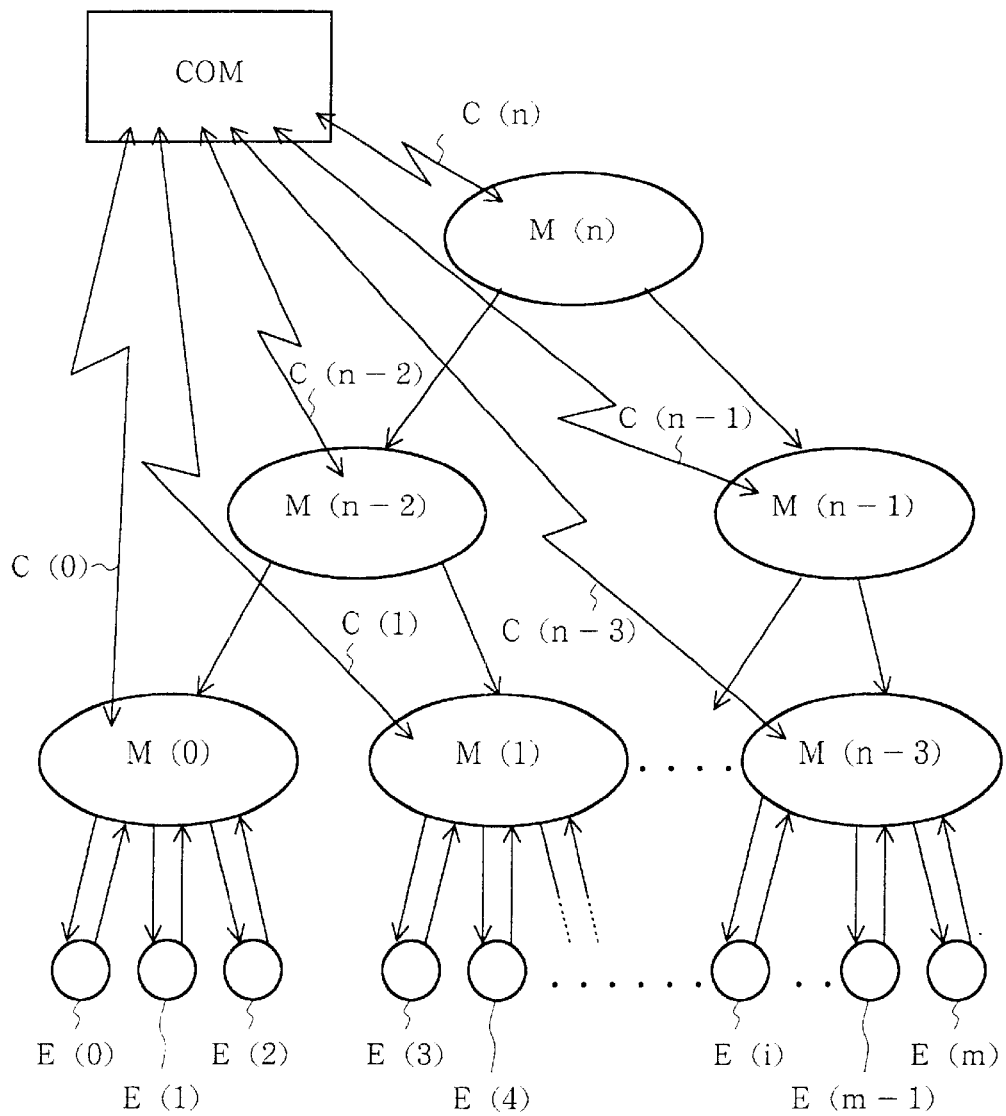
FIG. 12 shows the overall configuration of a control system according to the prior application.
Figure 13:
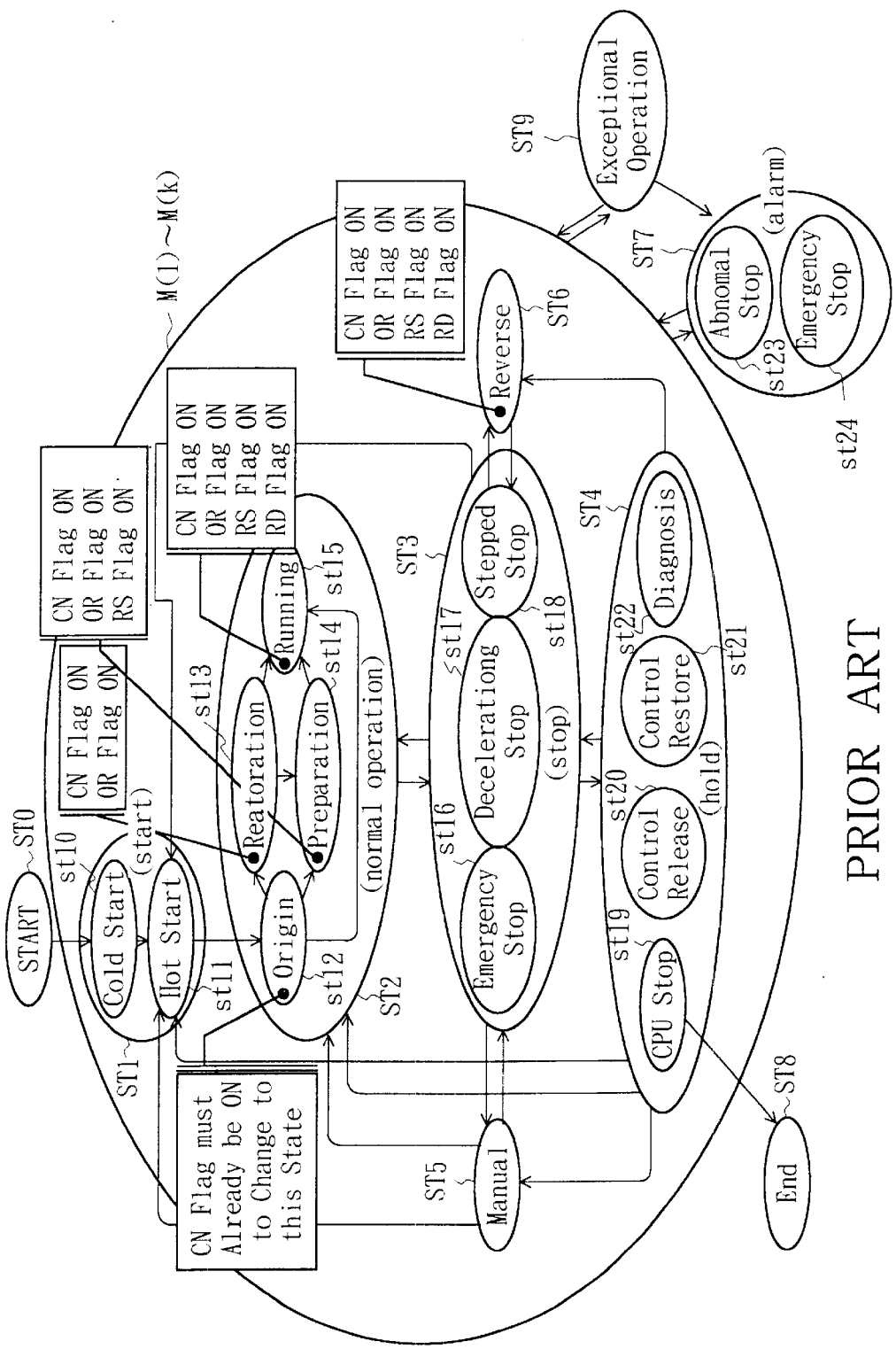
FIG. 13 shows the configuration of a control module according to the prior application.

This invention is a control system having, as shown in FIG. 12, a plurality of control modules M(0) to M(n) connected in a tree-configuration hierarchy successively branching from top to bottom, and, as shown in FIG. 1, command transmission part 10 for transmitting prescribed commands to these control modules M(0) to M(n). In embodiments of the invention, command transmission part 10 is provided within communication memory COM. However, although not specifically illustrated in FIG. 12, command transmission part 10 can be located anywhere provided that it can communicate via the CPU bus with control modules M(0) to M(n), or with the devices that constitute the command issuing sources.

It is a feature of the invention to provide command write register group 1 which, as shown in FIGS. 10 and 11, has a plurality of E-circuits corresponding to the control modules, each E-circuit including event register 100 and state register 101 in which commands can be written. A further feature of the invention is that command transmission part 10 has write controller 5 serving as means for writing commands in command write register group 1 in accordance with the aforementioned tree-configuration hierarchical relations. Another feature of the invention is that matrix controller group 7 expresses the tree-configuration hierarchical relations by turning intersections of switch matrix 8 on or off prior to the writing of a command. Yet another feature of the invention is that write controller 5 writes a prescribed command in command write register group 1 in accordance with write pulses that serve as the signals instructing writing of commands, these pulses having arrived via these intersections.

The aforementioned commands include state commands that require pre-emption processing (hereinafter, termed simply "pre-emption") whereby the command issuing source acquires in advance the right to issue the command to the control module that is the destination of that command, and event commands that do not require this pre-emption. A state command spreads to control modules that are connected hierarchically below the control module that is the destination of the command and that are not currently pre-empted by another command issuing source. An event command spreads to control modules that are connected hierarchically below the control module that is the destination of the command. Pre-emption registers 102 are provided for recording the pre-emption status of corresponding control modules M(0) to M(n). Tree register group 4 is provided for recording the tree-configuration hierarchical relations of corresponding control modules M(0) to M(n). Command receiving register 2 has command status part 23 for identifying the type of command that has been issued. When a state command has been identified, write controller 5 specifies, in accordance with the information recorded in pre-emption registers 102 and tree register group 4, the control modules to which this state command will spread. When an event command has been identified, write controller 5 specifies, in accordance with the information recorded in tree register group 4, the control modules to which this event command will spread. Write controller 5 also writes commands in event register 100 or state register 101 of the E-circuits of command write register group 1 that correspond to these specified control modules.

Switch matrix 8 is provided, this having X-axis and Y-axis signal lines as shown in FIG. 5, both sets of signal lines corresponding to the control modules. This switch matrix 8 causes a signal instructing the writing of a command for control module M(i), this signal having been output from X-axis signal line i, to be fed back as the input signal on Y-axis signal line i and then output by way of B-circuit (j-i) equivalent to intersection (j, i) from X-axis signal line j as a signal instructing the writing of a command for control module M(j) connected hierarchically below control module M(i).

A plurality of command transmission parts 10 are provided, each having a cascade output whereby a pulse for writing a command to a control module M(i) that is dealt with by another switch matrix, this pulse having been output from X-axis signal line h of switch matrix 8, is used as an input signal on Y-axis signal line i of the other switch matrix. Each of the plurality of command transmission parts 10 also has a cascade input whereby an input signal on Y-axis signal line j, this signal having been input from another switch matrix, is output from X-axis signal line k of local switch matrix 8 as a pulse for writing a command to a control module M(k) that is dealt with by the local switch matrix.

Figure 2:
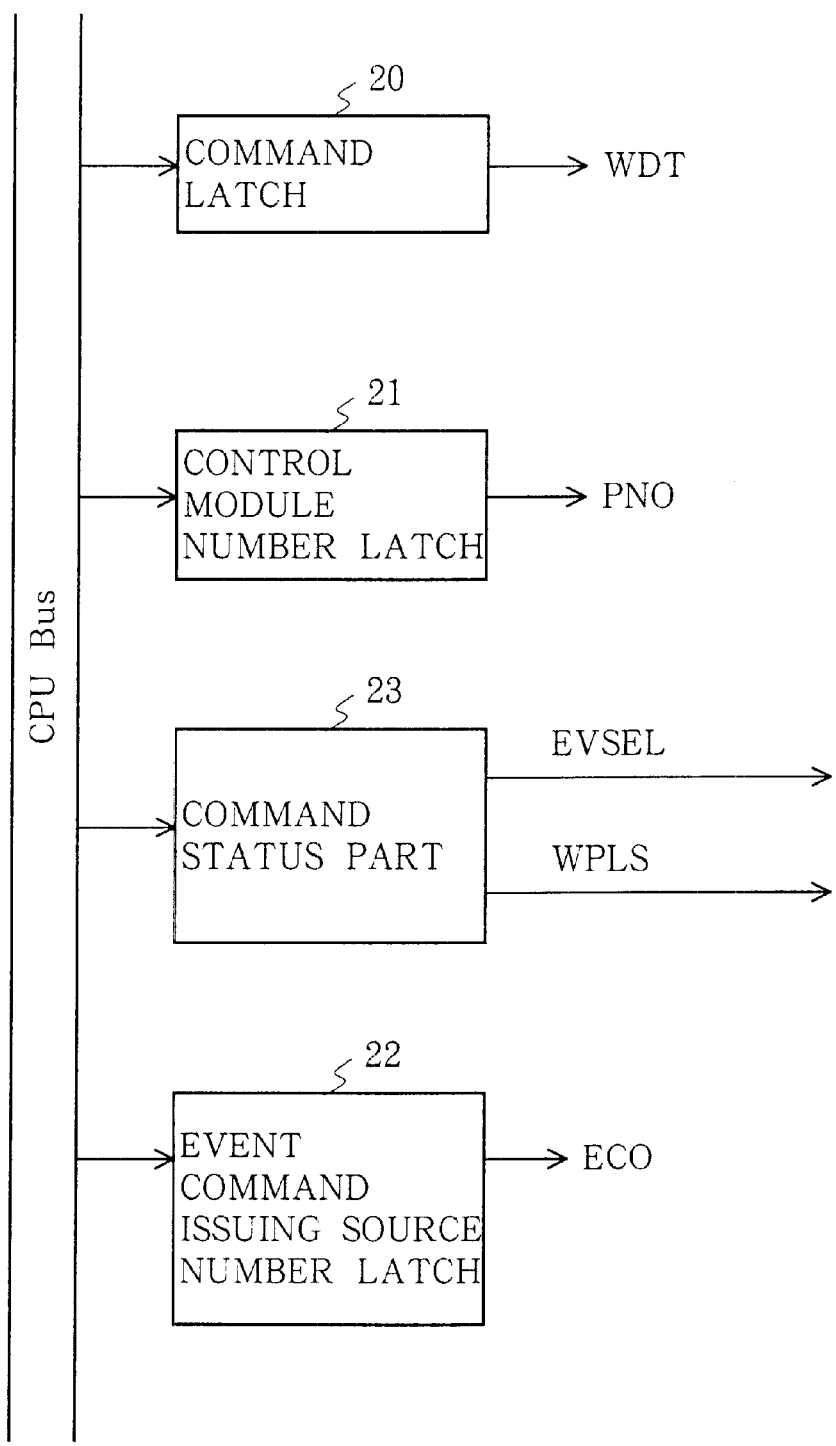
FIG. 2 is a block diagram of the command receiving register of an embodiment of the invention.

A more detailed description will now be given of the control system according to embodiments of this invention. FIG. 2 is a block diagram of the command receiving register. As shown in FIG. 2, command receiving register 2 is provided with command latch 20 for latching a command (WDT) that has been sent by a command issuing source; control module number latch 21 for latching the number (PNO) of the control module that is the target of the command; and event command issuing source number latch 22 for latching the event command issuing source number (ECO).

Command receiving register 2 is also provided with command status part 23 for outputting a selection signal (EVSEL) that serves to notify write controller 5 of the type of command that has been latched in command latch 20, and for outputting a write pulse (WPLS), which is required for writing a command to command write register group 1.

Figure 3:
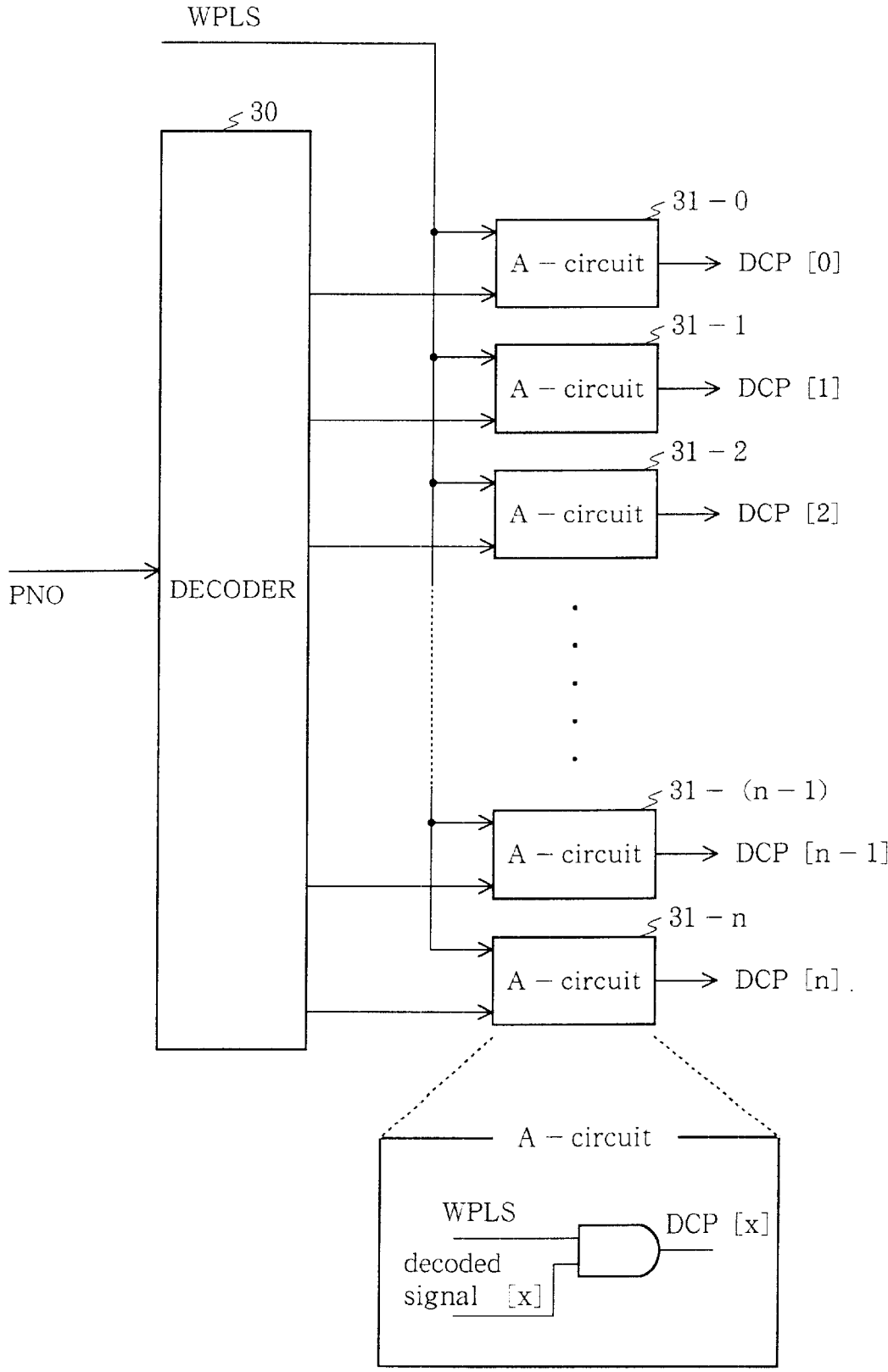
FIG. 3 is a block diagram of the component number decoder of an embodiment of the invention.

FIG. 3 is a block diagram of component number decoder 6. Decoder 30 decodes the control module number (PNO) that has been output from control module number latch 21, selects an A-circuit 31-0 to 31-n, and outputs a decoded signal (DCP[0] to DCP[n]).

Figure 4:
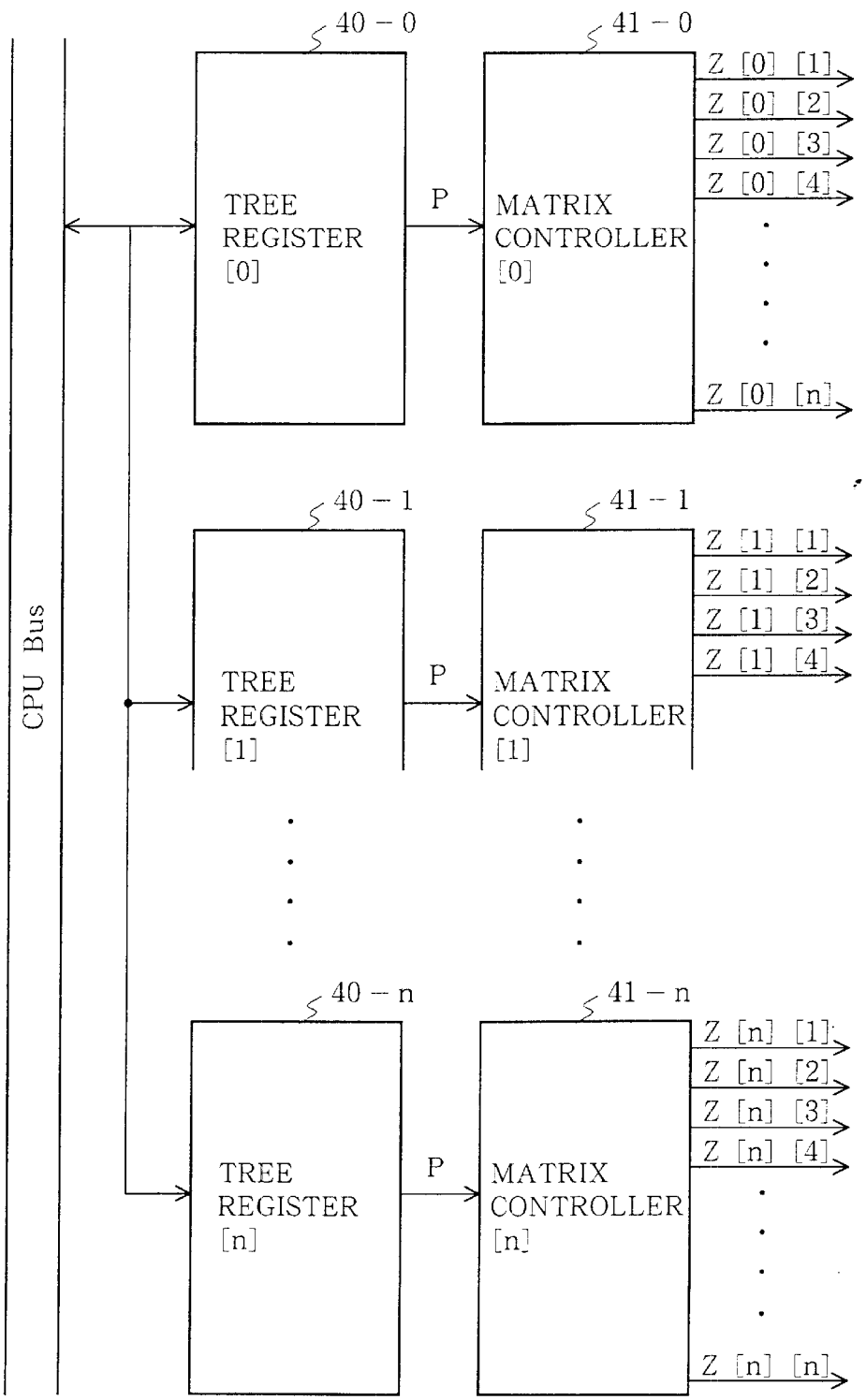
FIG. 4 shows the configuration of the tree registers and matrix controllers of an embodiment of the invention.

FIG. 4 is a block diagram of tree register group 4. Tree registers 40-0 to 40-n of tree register group 4 correspond respectively to control modules M(0) to M(n). Information relating to the location of a control module within the tree-configuration hierarchical relations is recorded in the corresponding tree register.

Matrix controllers 41-0 to 41-n correspond respectively to the control modules and serve to decode the information (P) relating to the tree-configuration hierarchical relations that has been recorded in tree registers 40-0 to 40-n, and to set switch matrix 8.

FIG. 5 is a block diagram of switch matrix 8, which comprises X-axis signal lines and Y-axis signal lines arranged with a B-circuit at each intersection. The B-circuits are switched on and off by signals (Z[0][1] to Z[n][n]) input from matrix controllers 41-0 to 41-n.

For example, if control modules M(3) and M(4) with numbers #3 and #4 are connected hierarchically below control module M(1) with number #1, signals Z[1][0], Z[3][1] and Z[4][1] are output from matrix controller group a result, B-circuits (1-0), (3-1) and (4-1) are switched on.

When signal Z[1][0] is input to the X-axis of switch matrix 8, signal X[1] is formed via B-circuit (1-0), and this signal X[1] is output from switch matrix 8 to write controller 5. Write controller 5 receives signal X[1] and writes the prescribed command to the E-circuit of command write register group 1 that corresponds to control module M(1) with number #1.

Figure 6:
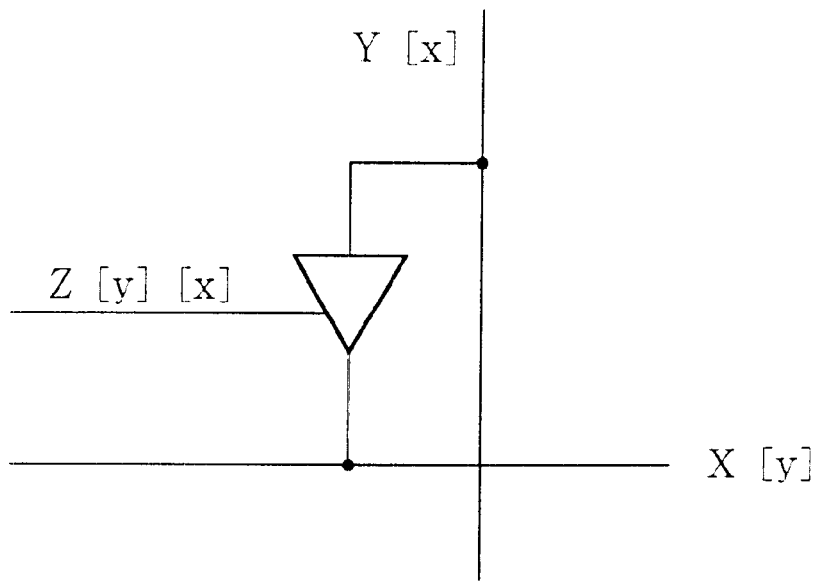
FIG. 6 shows a specific example of a B-circuit.

When signal X[1] is input to write controller 5, signal Y[1] is formed and is output from the write controller. When this signal Y[1] is input to the Y-axis of switch matrix 8, signals X[3] and X[4] are formed via B-circuits (3-1) and (4-1) and these signals X[3] and X[4] are output to write controller 5. Write controller 5 receives these signals X[3] and X[4] and writes the prescribed command to the E-circuits of command write register group 1 that correspond to control modules M(3) and M(4) with numbers #3 and #4. The specific configuration of the B-circuits is shown in FIG. 6.

Figure 7:
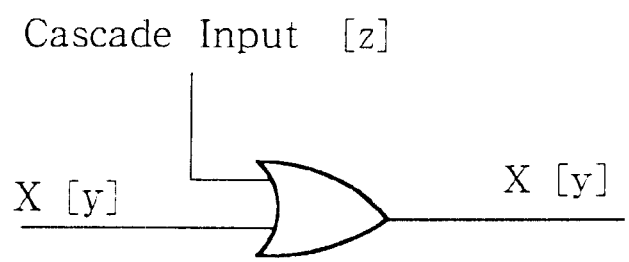
FIG. 7 shows a specific example of a C-circuit.

Some of the X-axis signal lines of switch matrix 8 are input to C-circuits. The signal that is output from a C-circuit (in the example of FIG. 5, X[1] and X[n]) is processed by write controller 5 in the same manner as the other signals, but then also serves as a cascade output and is connected to the cascade input of another command transmission part 10. The cascade input coming from another command transmission part 10 is connected to the input of the C-circuits. A plurality of command transmission parts 10 can be interconnected in this way, so that when a large number of control modules are being utilized, the tree-configuration hierarchical relations can extend to command transmission parts 10 of other trees. The specific configuration of the C-circuits is shown in FIG. 7.

Figure 8:
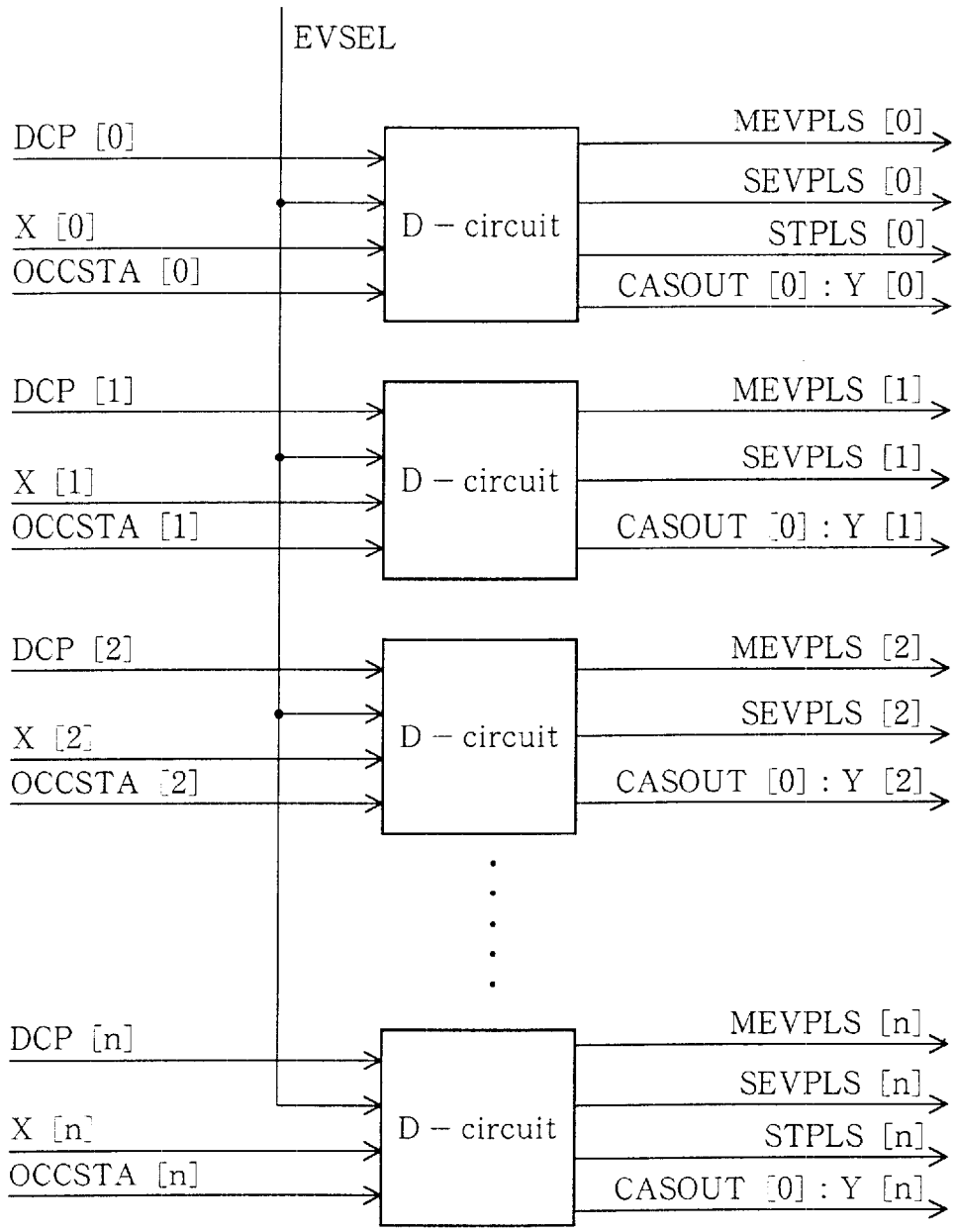
FIG. 8 is a block diagram of the write controller of an embodiment of the invention.

FIG. 8 is a block diagram of write controller 5. The following signals are input to the D-circuits: decoded signals (DCP[0] to DCP[n]) from A-circuits 31-0 to 31-n of component number decoder 6; signals (X[0] to X[n]) from switch matrix 8; pre-emption status signals (OCCSTA[0] to OCCSTA[n]) from pre-emption registers 102; and an event selection signal (EVSEL) from command receiving register 2.

Figure 9:
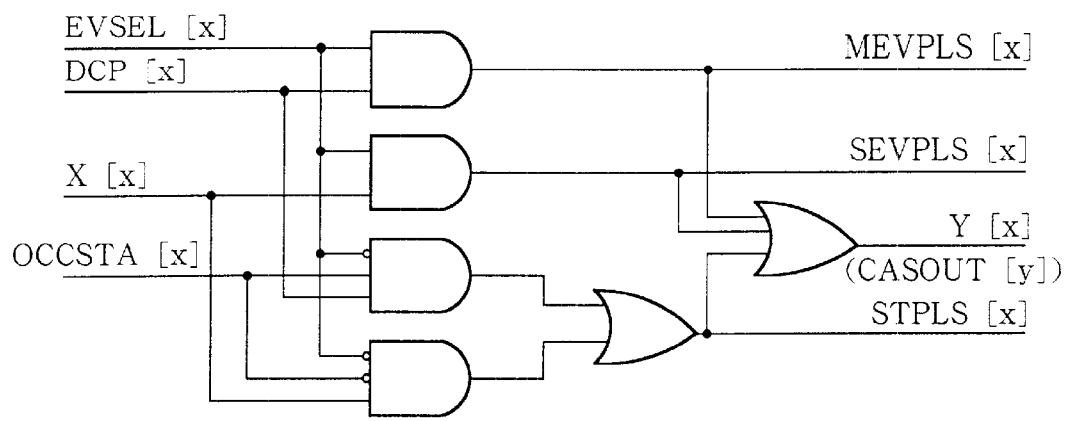
FIG. 9 shows a specific example of a D-circuit.

In the embodiments, decoded signals DCP[0] to DCP[n] are write pulses for control modules that correspond to a command destination. Signals X[0] to X[n] are write pulses for those control modules in the tree-configuration hierarchy to which a command is to spread. Pre-emption status signals OCCSTA[0] to OCCSTA[n] are write pulses for control modules that are not currently pre-empted by another command issuing source. Event selection signal EVSEL is a signal that goes high when the command being sent is an event command. Write pulses are output to prescribed control modules as a result of these signals being input to the logic gates of the D-circuits. A specific example of a D-circuit is shown in FIG. 9.

The D-circuits have the following outputs: a master event pulse (MEVPLS[x]), a slave event pulse (SEVPLS[x]), a state pulse (STPLS[x]), a signal for input to the switch matrix (Y[x]), and a cascade output (CUSOUT[y]). The master event pulse MEVPLS[x] is a write pulse whereby command write register group 1 reads an event command from command receiving register 2. In particular, it is a write pulse for the control module to which the event command is issued.

Like the master event pulse, the slave event pulse SEVPLS[x] is a write pulse whereby command write register group 1 reads an event command from command receiving register 2. However, unlike a master event pulse, the slave event pulse SEVPLS[x] is a write pulse for a control module connected hierarchically below the control module to which the event command is issued.

When, as a result of a master event pulse MEVPLS[x], an event command is written to event register 100 of the E-circuit corresponding to the control module to which the event command is issued, the event command issuing source number (ECO) is recorded in pre-emption register 102 of that E-circuit, either simultaneously with or immediately subsequent to receipt of the command.

When, as a result of a slave event pulse SEVPLS[x], an event command is written to the E-circuit of command write register group 1 that corresponds to a control module connected hierarchically below the control module to which the event command has been issued, an existing pre-emption of that control module is cancelled, either simultaneously with or immediately subsequent to receipt of the command.

The state pulse STPLS[x] is a write pulse whereby command write register group 1 reads a state command from command receiving register 2. The cascade output CUSOUT[y] is the signal which, when the control system includes another command transmission part 10, constitutes the cascade input that is connected to the C-circuits of switch matrix 8 of the other command transmission part 10.

FIG. 10 is a block diagram of command write register group 1. The E-circuits have the following inputs: event or state commands (WDT) that have been latched by command receiving register 2; event command write pulses MEVPLS [0] to [n] and SEVPLS[0] to [n]; event command issuing source number ECO; and state command write pulses STPLS[0] to [n]. These inputs are recorded in event register 100 or state register 101 or pre-emption register 102 shown in FIG. 11. Pre-emption register 102 records the pre-emption status and sends a pre-emption status signal OCCSTA[x] to write controller 5.

The data configuration of the commands will now be described. Event commands include commands that instruct a control module to undergo transition from the state it was in prior to the event command being issued, to any of the following states: urgent stop mode, decelerating stop mode, stepped stop mode, EXCEPT mode, SHUTDOWN code, emergency stop mode, abnormality stop mode.

State commands include commands that instruct a control module to undergo transition from the state it was in prior to the state command being issued, to any of the following states: start mode, initialization mode, origin mode, restoration mode, preparation mode, normal operating mode, manual control mode, reverse mode, diagnostic mode, urgent stop mode, decelerating stop mode, stepped stop mode, free mode, hold mode, EXCEPT mode, SHUTDOWN mode, emergency stop mode, abnormality stop mode.

Job commands include commands that instruct a control module to undergo transition from the state it was in prior to the job command being issued, to any of the following states: start mode, initialization mode, origin mode, restoration mode, preparation mode, normal operating mode, manual control mode, reverse mode, diagnostic mode, urgent stop mode, decelerating stop mode, stepped stop mode, free mode, hold mode, EXCEPT mode, SHUTDOWN mode, emergency stop mode, abnormality stop mode.

The following numbers of bytes are used when transmitting each command: 4 bytes for the event number, 40 bytes for various parameters, 4 bytes for the command itself, 2 bytes for indicating the position in command receiving register 2 at which the command is to be written, and 2 bytes for indicating the position in command write register group 1 at which the command is to be written.

The various parameters include, inter alia, information relating to the command issuing source and the command destination. Control module number information serves as the information relating to the command destination, and this can be represented for example using 8 bits provided that the number of control modules does not exceed 256.

The overall operation of command transmission part 10 according to embodiments of this invention will now be described. The current tree-configuration hierarchical relations of control modules M(0) to M(n) are recorded in tree register group 4 of command transmission part 10. More specifically, tree registers 40-0 to 40-n are provided in correspondence with respective control modules, and in each of these tree registers there is recorded, for the corresponding control module, information relating to control modules that are hierarchically above it and information relating to control modules that are hierarchically below it.

When a command issuing source issues a command to a control module M(i) shown in FIG. 12, if the command to be issued is a job command or a state command, the command issuing source pre-empts the control module to which the command is to be issued, prior to the command being issued. A job command is a command that is transmitted to control modules after they have been pre-empted, and that does not spread to other control modules. Since the operation of command transmission part 10 in respect of job commands is self-evident, no further description will be given. State commands and event commands will now be described.

First of all, operation in respect of state commands will be described. When a state command issuing source issues a state command to control module M(i) to which the state command is to be issued, it first of all confirms that control module M(i) is not currently pre-empted by another command issuing source. Then, if control module M(i) is not currently pre-empted by another command issuing source, it pre-empts that control module M(i).

The actual flow of operations is as follows. A state command issuing source accesses, via the CPU bus, pre-emption register 102 in the E-circuit of command write register group 1 that corresponds to control module M(i), and confirms the pre-emption status. If as a result of this it is confirmed that the control module is not currently pre-empted by another command issuing source, the state command issuing source records, in pre-emption register 102, the fact that it has pre-empted control module M(i). Pre-emption register 102 then sends a pre-emption status signal (OCCSTA[i]) to notify write controller 5 of the fact that control module M(i) has been pre-empted by this state command issuing source. The pre-emption status signal OCCSTA[i] contains the most significant bit of pre-emption register 102. The state command issuing source issues the state command after it has performed pre-emption in this manner.

The issued state command is latched, via the CPU bus, by command latch 20 of command receiving register 2. The number (PNO) of the control module to which the state command has been issued is latched by control module number latch 21, and this control module number (PNO) is sent to component number decoder 6. At the same time, a write pulse (WPLS) is sent from command receiving register 2 to component number decoder 6.

Component number decoder 6 decodes the control module number (PNO) and inputs it as decoder output to the corresponding A-circuit. The write pulse (WPLS) is also input to the A-circuits. A decoded signal (DCP(i)) is sent to write controller 5 from the A-circuit to which both a decoder output and the write pulse (WPLS) have been input.

In parallel with this processing, tree register group 4 sends a signal (P) containing information relating to the tree-configuration hierarchical relations to matrix controller 41-i from tree register 40-i corresponding to control module M(i) to which the state command is issued, this state command having been written in command receiving register 2. Matrix controller 41-i sets B-circuits in switch matrix 8 in accordance with the hierarchical relations signal (P).

When the setting of the B-circuits in switch matrix 8 is completed, write controller 5 sends to switch matrix 8, in accordance with decoded signal DCP(i), signal Y[i] corresponding to the control module M[i] in question.

As a result of signal Y[i], X-axis signals x are sent from switch matrix 8 to write controller 5 in accordance with the tree-configuration hierarchical relations. The details of this operation are as described previously. A succession of signals x are sent from switch matrix 8 to write controller 5, and write controller 5 sends state pulses STPLS to E-circuits of command write register group 1 in accordance with these signals x, these state pulses STPLS being state command write pulses. The E-circuits write, in accordance with these state pulses STPLS, the state command (WDT) from command receiving register 2 to state register 101 of the E-circuits corresponding to the control modules in question. During this process, write controller 5 confirms the pre-emption status by means of the pre-emption status signal OCCSTA[i] from pre-emption register 102, and ensures that a state pulse STPLS is not sent to an E-circuit corresponding to a control module that is currently pre-empted by another command issuing source.

The foregoing processing results in the state command being written to state registers 101 of the E-circuits corresponding to all the control modules to which the state command has to be transmitted, in accordance with the tree-configuration hierarchical relations and the pre-emption status.

Operation in respect of event commands will now be described. An event command issuing source issues an event command to a control module M(i) to which the event command is to be issued. The issued event command is first of all latched, via the CPU bus, in command latch 20 of command receiving register 2.

Although pre-emption processing is not required in order to issue an event command, a control module that is the destination of an event command performs, either simultaneously with or subsequent to receipt of the event command, the same processing as when it is pre-empted. This processing is cancelled after the event command is cancelled. This ensures that after the event command has been cancelled, the control module can undergo appropriate state transitions in accordance with the state of hierarchically superior control modules. Furthermore, a control module that is connected hierarchically below a control module that is the destination of an event command has an existing pre-emption cancelled, either simultaneously with or subsequent to receipt of the event command.

As the aforementioned "same processing as when it is pre-empted", the event command issuing source number (ECO), which is the information relating to the event command issuing source, is latched by event command issuing source number latch 22 and recorded in pre-emption register 102 of an E-circuit. The recording of the event command issuing source number (ECO) in pre-emption register 102 is deleted when the relevant processing is cancelled.

The actual flow of operations is as follows. A master event pulse (MEVPLS) is input from write controller 5 to the E-circuit corresponding to control module M(i) to which the event command is issued. This results in the event command (WDT), which has been sent from command latch 20, being written in event register 100 of the E-circuit, and in the number (ECO) of the issuing source of this event command being recorded in pre-emption register 102.

Slave event pulse SEVPLS is input from write controller 5 to control modules connected hierarchically below control module M(i) to which the event command is issued. This results in the event command WDT, which has been sent from command latch 20, being written in event register 100 of the E-circuits, and in pre-emption registers 102 being reset.

Subsequent operations are similar to the example of the state command. Namely, the number (PNO) of the control module to which the event command has been issued is latched by control module number latch 21, and this control module number (PNO) is sent to component number decoder 6. At the same time, a write pulse (WPLS) is sent from command receiving register 2 to component number decoder 6.

Component number decoder 6 decodes the control module number (PNO) and inputs it as decoder output to the corresponding A-circuit. The write pulse (WPLS) is also input to the A-circuits. A decoded signal (DCP(i)) is sent to write controller 5 from the A-circuit to which both a decoder output and the write pulse (WPLS) have been input.

In parallel with this processing, tree register group 4 sends a signal (P) containing information relating to the tree-configuration hierarchical relations to matrix controller 41-i from tree register 40-i corresponding to control module M(i) to which the event command is issued, this event command having been written in command receiving register 2. Matrix controller 41-i sets B-circuits in switch matrix 8 in accordance with the hierarchical relations signal (P).

When the setting of the B-circuits in switch matrix 8 is completed, write controller 5 sends to switch matrix 8, in accordance with decoded signal DCP(i), signal Y[i] corresponding to the control module M[i] in question.

As a result of signal Y[i], X-axis signals x are sent from switch matrix 8 to write controller 5 in accordance with the tree-configuration hierarchical relations. The details of this operation are as described previously. A succession of signals x are sent from switch matrix 8 to write controller 5, and write controller 5 sends a master event pulse MEVPLS and slave event pulses SEVPLS to E-circuits in accordance with these signals x, these master and slave event pulses being event command write pulses. The E-circuits write, in accordance with master event pulse MEVPLS and slave event pulses SEVPLS, the event command (WDT), which has been sent from command latch 20, to event register 100 of the E-circuits corresponding to the control modules in question. This results in the event command being written to the E-circuits of command write register group 1 corresponding to all the control modules to which the event command has to be transmitted, in accordance with the tree-configuration hierarchical relations.

The present invention enables commands to be transmitted and processed in a short time in the manner described above. As a result, the invention can provide a control system capable of coping easily with a plurality of different situations, and of simplifying control, by using a plurality of command types with different characteristics.

What is claimed is:

1. A control system, comprising:
    a plurality of control modules connected in a hierarchical tree configuration with each control module having an identity associated with a level within the hierarchical tree configuration; and a command transmission mechanism configured to transmit commands to the control modules, the command transmission mechanism including, a command write register group having a plurality of command write registers that correspond to the control modules and are capable of being written to, a write control mechanism to write commands in the command write register group in accordance with the hierarchical level of the control modules, and a matrix controller to provide the identity of the control modules, based on their hierarchical level, by turning on or off intersections of a switch matrix, wherein the write control mechanism writes commands in the command write register group in accordance with write command signals that arrive via the switch matrix intersections, and wherein the switch matrix is configured with signal lines that correspond to the control modules and is capable of providing a write command signal for a hierarchically lower level control module based on a feed-back of write command signal corresponding to a hierarchically higher level control module.

2. The control system of claim 1, wherein the commands include, state commands that operate with preemption processing, the preemption processing enabling command-issuing sources to acquire, in advance, the right to issue the commands to the control modules that are the destinations of the commands, the state commands being configured to spread to the control modules that are connected at a hierarchically lower level than the destination control modules of the commands and that are not currently preempted by other command-issuing sources, and event commands that do not operate with the preemption processing, the event commands being configured to spread to the control modules that are connected at a hierarchically lower level than the destination control modules of the commands.

3. The control system of claim 2, further including, a plurality of preemption registers for recording the status of the preemption processing for the control modules, and a plurality of tree registers for recording the level and attributes of the hierarchical tree configuration for the control modules.

4. The control system of claim 3, wherein the write control mechanism includes, means for identifying the type of command, means for specifying the control modules to which a state command will spread based on information recorded in the preemption and tree registers, means for specifying the control modules to which an event command will spread based on information recorded in the tree registers, and means for writing commands to the command write registers corresponding to the specified control modules.

5. The control system of claim 1, wherein the signal lines include X-axis and Y-axis signal lines and wherein the switch matrix provides a write command signal for a hierarchically lower level control module based on the write command signal of a hierarchically higher level control module by using a write command signal outputted from an X-axis signal line i that corresponds to a control module i, and feeding it back to the switch matrix as an input write command signal on a Y-axis line i, which is then outputted, via switch matrix intersection (j, i), on an X-axis signal line j as a write command signal corresponding to control module j, which is at a hierarchically lower level than control module i.

6. The control system of claim 5, further including a plurality of switch matrices wherein the write control mechanism includes, means whereby a write command signal outputted from an X-axis signal line h to a control module i that is processed by a remote switch matrix is used as an input signal on a Y-axis signal line i of the remote switch matrix, and means whereby an input signal on a Y-axis signal line j, that is inputted from a remote switch matrix, is outputted on an X-axis signal line k of the local switch matrix as a write command signal to control module k that is processed by the local switch matrix.

* * * * *